Feb. 8, 1944. R. C. DICKINSON ET AL 2,340,942
CIRCUIT BREAKER
Filed Feb. 25, 1941 3 Sheets-Sheet 1
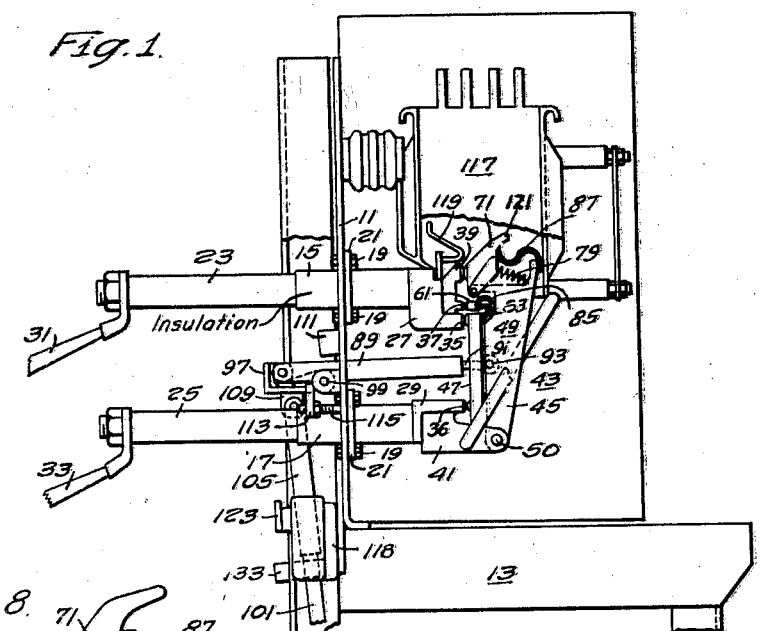
Fig. 1.
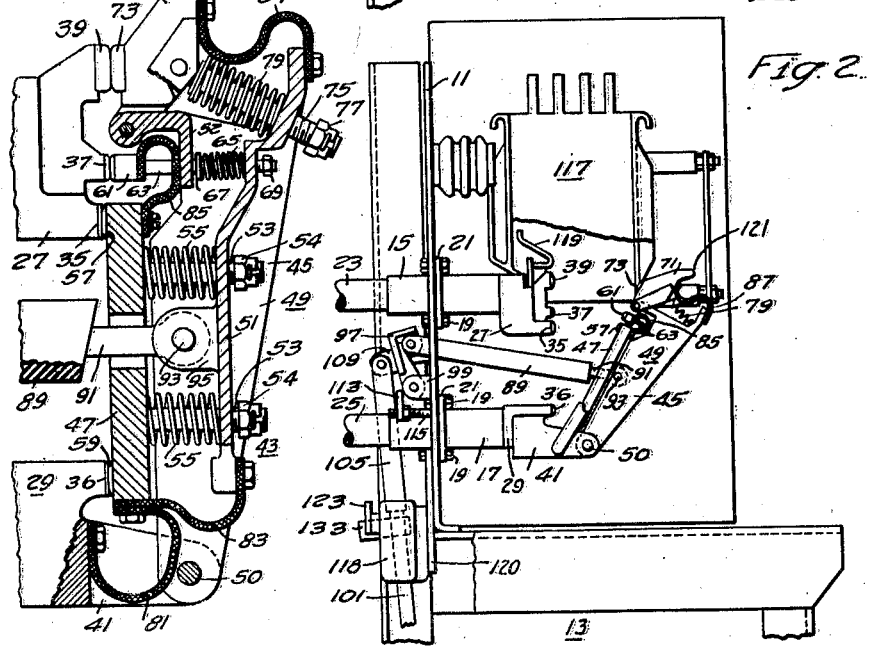
Fig. 8.
Fig. 2.
WITNESSES:
E. A. McCloskey
Paul O. Harler
INVENTORS
Robert C. Dickinson
and Winthrop M. Leeds.
BY
Ralph H. Swingle
ATTORNEY

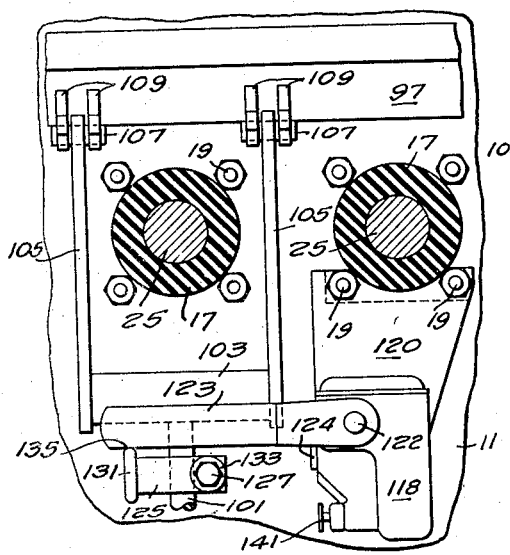
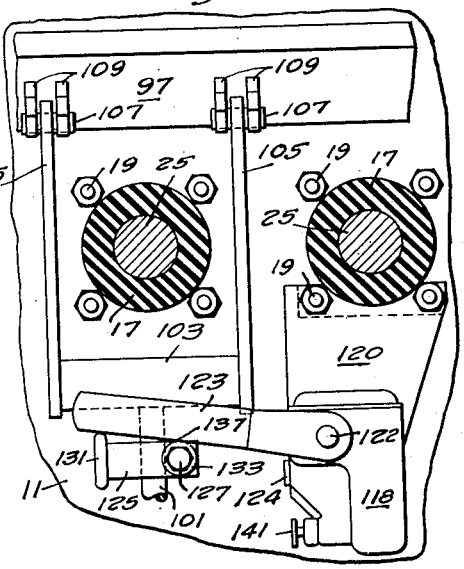
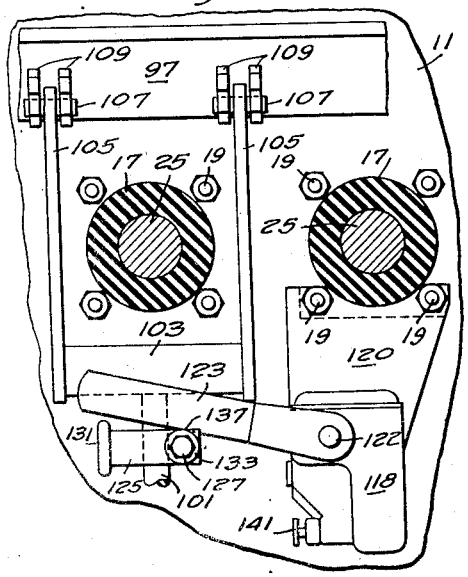
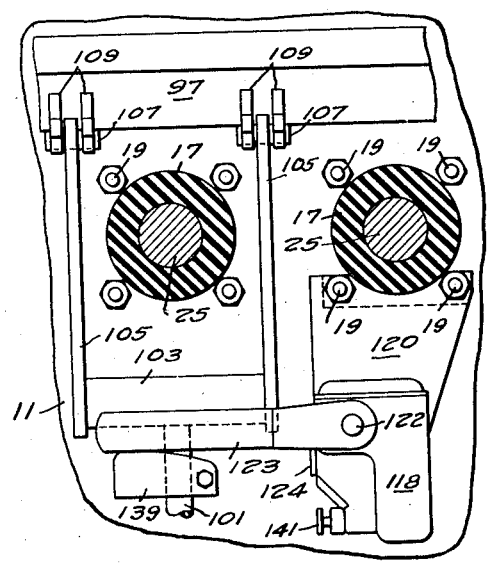

Feb. 8, 1944.　　　R. C. DICKINSON ET AL　　　2,340,942
CIRCUIT BREAKER
Filed Feb. 25, 1941　　　3 Sheets-Sheet 3
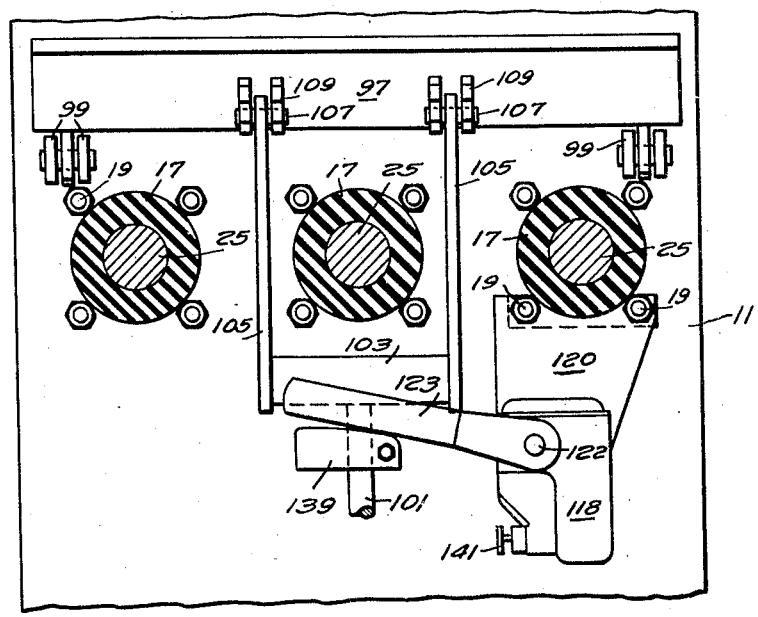
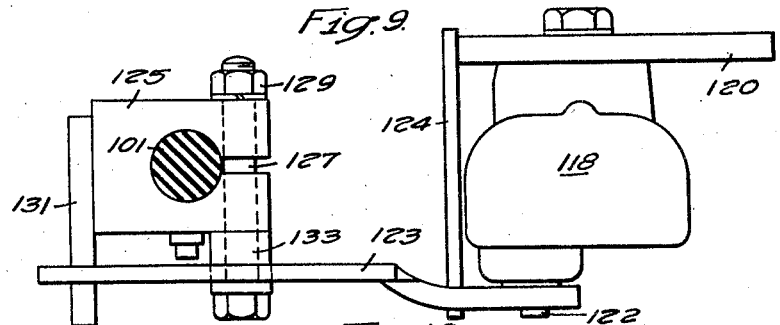
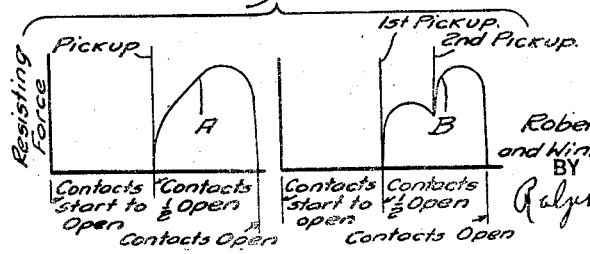
WITNESSES:
INVENTORS
Robert C. Dickinson
and Winthrop M. Leeds.
BY
ATTORNEY Patented Feb. 8, 1944

2,340,942

UNITED STATES PATENT OFFICE 2,340,942

CIRCUIT BREAKER

Robert C. Dickinson and Winthrop M. Leeds, Wilkinsburg, Pa., assignors to Westinghouse Electric & Manufacturing Company, East Pittsburgh, Pa., a corporation of Pennsylvania Application February 25, 1941, Serial No. 380,524

3 Claims. (Cl. 200—97)

This invention relates to high-speed circuit breakers for controlling moderate to large amounts of electric power and to means for absorbing the kinetic energy of the moving parts during an operating stroke of the breaker.

Circuit breakers of large current carrying capacity are usually provided with powerful spring means or other operating devices for moving the circuit breaker to open position at high speed. It has been difficult in circuit breakers of this character to absorb the kinetic energy of the moving parts during opening of the breaker and to prevent the contacts from reestablishing the circuit due to rebound of the movable contacts from fully open position. Air shock absorbers have been utilized in the prior art for this purpose but they become too bulky when designed for high-speed circuit breakers having high kinetic energy.

Liquid shock absorbers as used on other devices such, for instance, as automobiles are not suitable because the maximum resisting force is exerted upon pick-up of the absorber. If the resisting force is too high the contacts will rebound upon striking the absorber and before the full opening stroke is attained. If the resisting force is too low, rebound will not be greatly reduced because the resisting force falls to a low value when the velocity is low.

It is, therefore, an object of this invention to provide a circuit breaker having an improved means for absorbing the kinetic energy of the moving parts during an operating stroke of the breaker and for preventing rebound of the moving contacts.

Another object of the invention is to provide a circuit breaker having an improved shock absorber including means for applying a relatively light initial resisting force to the moving parts of the breaker at an intermediate point in the operating stroke and then increasing the resisting force later in the stroke.

Another object of the invention is to provide a circuit breaker having a shock absorber for controlling movement of the breaker including a dual control member cooperating with the shock absorber to cause the absorber to first apply a light resisting force and then increase the resisting force to absorb the kinetic energy of the moving parts.

Another object of the invention is to provide a circuit breaker having a shock absorber for controlling the movement of the breaker including a single control member cooperating with the shock absorber to cause the absorber to first apply a light resisting force to the opening movement of the breaker and then gradually increase the resisting force.

Another object of the invention is to provide a circuit breaker having a shock absorber for controlling the opening movement of the breaker during the later portion of the opening stroke comprising a control member provided with a curved surface arranged so that initially the effective moment arm of the absorber is long to apply a light initial resisting force, the effective moment arm decreasing so as to increase the applied resisting force near the end of the contact movement.

The novel features that are considered characteristic of the invention are set forth in particular in the appended claims, the invention itself, however, both as to structure and operation, together with additional objects and advantages thereof, will be best understood from the following detailed description of its embodiments when read in conjunction with the accompanying drawings, in which:

Figure 1 is a fragmentary side elevational view of the circuit breaker with the contacts in the closed position;

Fig. 2 is a view similar to Fig. 1 but showing the breaker in open circuit position;

Fig. 3 is a detail view of the shock absorber and the contact operating rod with the dual pick-up arm just in contact with the shock absorber arm;

Fig. 4 is a detail view similar to Fig. 3 but with the shorter pick-up arm in contact with the shock absorber arm;

Fig. 5 is a detail view showing the parts in the positions assumed when the contacts are fully open;

Fig. 6 is a detail view showing a modified form of pick-up arm in contact with the shock absorber arm;

Fig. 7 is a detail view similar to Fig. 6 but with the parts in their fully open contact position;

Fig. 8 is a detail view partly in section of the switch assemblage;

Fig. 9 is a plan view of the shock absorber and pick-up arm;

Fig. 10 is a graphic illustration of the resisting force and contact travel.

Referring to Figures 1 and 2 of the drawings, the circuit breaker is mounted on a steel frame 11 supported on a base 13. The breaker is of the multi-pole type and includes three poles actuated by a single operating mechanism. Since the structure of each of the poles is alike only one pole is hereinafter described. A pair of insulating bushings 15 and 17 of strong insulating material extend through spaced openings in the frame 11 and are rigidly secured to the frame by means of bolts 19 extending through flanges 21 secured to the bushings. A pair of spaced terminal conductors 23 and 25 extend through and are rigidly supported by the bushings 15 and 17 which insulate the terminals from the frame 11. The terminal conductors 23 and 25 form the two terminals of the breaker.

A pair of stationary contact members 27 and 29 (see also Fig. 8) are rigidly mounted on the ends of the terminal conductors 23 and 25. These contact members are connected in the circuit controlled by the breaker by means of terminal connectors 31 and 33. The upper contact member 27 is provided with a main contact 35, an auxiliary contact 37 and an arcing contact 39. The lower contact member 29 carries a contact 36 and has a yoke-shaped extension 41 rigidly secured thereto which serves to pivotally support a movable contact assemblage indicated generally at 43.

The movable contact assemblage comprises a channel-shaped switch member 45 (Fig. 8) which is pivotally supported on the extension 41 of the lower stationary contact member 29, and a bridging contact arm 47. The switch member 45 comprises a pair of spaced parallel side members 49 rigidly joined by cross members 51 and 52 and pivoted on a pivot pin 50 in the extension 41. The contact arm 47 is movably supported on the member 51 by guide bolts 53 which slidably project through suitable openings in the cross member 51. The bolts 53 are provided with nuts 54. Springs 55 surrounding the bolts 53 and compressed between the contact arm 47 and the member 51 serve to apply pressure to the contacts when the contacts are closed.

The movable contact arm is provided with contacts 57 and 59 which cooperate with the stationary main contacts 35 and 36, respectively. An auxiliary movable contact 61 is secured to the end of a rod 63 slidably mounted in the cross members 51 and 52. A spring 65 compressed between the cross member 51 and a collar 67 secured on the rod 63 serves to apply pressure to the contact 61 when closed, and suitable clearances between a nut 69 and the cross member 51 and between the collar 67 and the cross members 52 insures that the contacts 61—37 will open after the main contacts 35—57 and 36—59 have opened during an opening operation, since these clearances are slightly greater than the clearances between the nuts 54 of the bolts 53 and the cross member 51.

A main arcing switch member 71 pivotally supported on the switch member 45 is provided with an arcing contact 73 which cooperates with the stationary arcing contact 39. A rod 75 pivotally connected to the auxiliary switch member 71 is slidable in a suitable opening in the cross member 51 and has a nut 77 screwed onto its outer end. A spring 79 is compressed between the member 51 and the switch member 71 serves to provide contact pressure. The nut 77 is so spaced from the cross member 51 that the arcing contacts 39—73 open after the contacts 37—61.

Flexible shunt conductors are provided to connect the movable contacts with the lower terminal conductor 25. One shunt conductor 81 (Fig. 8) connects the movable contact arm 47 to the terminal conductor 29 and another shunt conductor 83 connects the contact arm 47 to the cross member 51. A flexible shunt conductor 85 connects the auxiliary contact 61 to the movable contact arm 47 and the arcing contact member 71 is connected to the cross member 51 by a flexible shunt conductor 87.

An operating rod 89 (Figs. 1 and 8) of strong insulating material has one of its ends pivotally connected to the switch member 45 by a link 91. One end of this link is secured to the rod 89 and the other end is pivotally connected to the cross member 51 by a pivot pin 93 (Fig. 8) which extends through openings in ears 95 projecting from the cross member 51. The opposite end of the operating rod 89 is pivotally connected to a crank 97 extending across all three poles and pivotally supported by spaced brackets 99 (see also Fig. 7) secured to the frame 11. A vertically disposed operating rod 101 is rigidly secured at its upper end to a bar 103 having parallel arms 105 rigidly secured to its ends. The bar 103 and arms 105 form a yoke for clearing the terminal conductor 25 for the center pole (Fig. 7). The upper ends of the arms 105 are pivotally connected to the crank 97 by pivot pins 107 extending through openings in projections 109 integral with the crank 97 and openings in the ends of the arms 105.

The operating rod 101 is adapted to be connected to a suitable operating mechanism (not shown) for moving the switch assemblage 43 to open and to closed circuit positions. The opening movement of the switch assemblage is limited by the crank 97 striking a projection 111 on the frame 11 and the closing movement is limited by the crank 97 striking a stop member 113 adjustably mounted on bolts 115 projecting from the frame 11. The operating mechanism is not an important part of the instant invention since any suitable mechanism of the type embodying an opening spring for biasing the switch assemblage to open position, means for moving the switch to closed position and a suitable tripping device for causing opening movement of the switch may be used. A suitable form of operating mechanism which may be connected to the vertical operating rod 101 is disclosed in United States Patent No. 1,807,020, granted May 26, 1931, to R. C. Van Sickle, and assigned to the assignee of the present invention.

When the breaker is opened the arc resulting from the rupture of the circuit is extinguished by being drawn into an arc extinguisher indicated at 117 (Figs. 1 and 2) by means of an arcing horn 119 secured to the terminal conductors 23 adjacent the arcing contact 39, and an arcing tip 121 integral with the switch member 71. The arc extinguisher is not herein described in detail since it does not form an important part of the present invention. Any suitable arc extinguisher may be employed.

When the breaker is in the closed circuit position (Fig. 1) the latch of the operating mechanism (not shown) releasably holds the operating rods 101 and 89 and the switch assemblage 43 in closed position against the influence of the breaker opening spring and the several contact springs 55, 65 and 79 which are held in compression due to the switch assemblage having been moved slightly beyond the position at which the contact arm 47 closes the main contacts.

When the breaker is tripped, the operating rod 101 is thrust upwardly at high speed by the force exerted by the opening spring of the breaker operating mechanism. This movement is transmitted by the crank 97 and rod 89 to the switch assemblage and, together with the reactive force of the contact springs, rocks the switch assemblage clockwise about its pivot 50. This movement of the switch assemblage 43 first separates the main contacts 35—37 and 36—59. The auxiliary contacts 37—61 are opened shortly thereafter and finally the circuit is broken upon opening of the arcing contacts 39—73 the current being carried over the terminal conductor 25, and the flexible shunt conductors 81 and 83, the cross member 51 and the flexible shunt conductor 87 to the arcing contact member 71.

As stated previously the clockwise or opening movement of the switch assemblage is limited by the crank 97 striking the stop 111 (Fig. 1). If the mechanism, traveling at high speed, is suddenly arrested the high kinetic energy causes a sharp rebound of the switch assemblage towards closed position. The rebound is heightened by the reaction of the contact pressure springs 55, 65 and 79 which are compressed when the switch assemblage is brought to a sudden stop during the opening movement.

An important feature of this invention is the provision of a shock absorber so arranged and cooperating with the switch mechanism in such a manner as to first apply a relatively light resisting force, then to increase the resisting force. Efforts have been made before to apply air or pneumatic shock absorbers to circuit breakers to prevent rebound but in high-speed large capacity breakers such absorbers are so bulky that space does not permit their use.

The shock absorber of the instant invention is of the liquid single-acting type and is indicated at 117. The absorber itself comprises the usual cylinder and piston and is provided with an internal arm bearing on the piston and a spring for restoring the piston after an operation. The shock absorber 118 is mounted on a bracket 120 secured to the frame 11 by means of two of the bolts which secure the bushing 17 to the frame. A short shaft 122 has secured to its inner end an arm (not shown) which engages the piston (also not shown) and at the outer end of the shaft is secured an arm 123 extending substantially horizontally adjacent the vertical operating rod 101. An arm 124 secured to the bracket 120 limits the counterclockwise movement of the arm 123 (see Fig. 9).

A dual pick-up arm (Fig. 9) comprising a split block 125 is adjustably clamped to the operating rod 101 by means of a bolt 127 and nut 129. Integral with the block 125 is a pick-up arm 131 projecting at substantially right angles across the plane of the arm 123. A second pick-up arm 133 in the shape of a cylinder is secured to the block 125 by means of the bolt 127. The arm 133 also extends across the plane of the arm 123.

When the switch assemblage 43 (Fig. 1) is in the closed circuit position, the pick-up arms 131 and 133 are below and out of engagement with the arm 123, the counterclockwise movement of said arm 123 being limited by the stop arm 124. The initial upward movement of the operating rod 101 and the first part of the opening movement of the contact assemblage 43 are, therefore, free of any resisting force imposed by the shock absorber. This permits the parts to move at high velocity during the initial movement of the opening stroke. By adjusting the pick-up arms 131 and 133 relative to the shock absorber arm 123 the time at which the resisting force of the absorber will be applied may be varied.

When the breaker is tripped, the operating rod 101 is moved upwardly at high speed by the force exerted thereon by the opening spring of the breaker operating mechanism. After the movement during which the mechanism moves at high velocity and free of restraint, the pick-up arm 131 engages the shock absorber arm 123 and the restraining force of the absorber is applied to decelerate the speed of the moving parts of the circuit breaker and its mechanism. The parts are shown in Fig. 3 at the instant the pick-up arm 131 engages the arm 123. As the rod 101 continues its upward travel the distance from the center of the shaft 122 to the point of contact indicated at 135 of the pick-up arm 131 with the arm 123 slightly increases thus reducing slightly the applied resisting force of the absorber.

Fig. 4 shows the parts in the positions they assume when the second pick-up arm 133 engages the absorber arm 123. Since the distance from the center of the shaft 122 to the point of contact indicated at 137 of the pick-up arm 133 with the arm 123 is less than the distance 122—135, the effective restraining force applied by the shock absorber increases, which results in a rapid deceleration of the speed of the moving parts. This occurs near the end of the opening movement. The result is that the energy of the moving parts is largely dissipated before the crank 97 (Fig. 1) strikes the stop 111 and the rebound of the switch assemblage 43 is minimized.

Figs. 6 and 7 illustrate a modification of the pick-up arm in which a cam member 139 is substituted for the dual pick-up arms 131 and 133. The configuration of the upper face of the member 139 is such that the effective moment arm of the absorber arm 123 is long when the cam 139 first engages the arm 123 and decreases rapidly as the arm 123 rolls on the cam face. This action results in first applying a light resisting force which increases as the breaker approaches open position.

When the parts are in the closed circuit position, the cam 139 occupies a position below the arm 123 and a sufficient distance therefrom to permit unrestrained movement of the switch assemblage to approximately half open position or to a position such that any arc will have been completely extinguished before the cam 139 engages the arm 123. Fig. 6 shows the parts in the position when the cam 139 picks up the arm 123. Fig. 7 shows the pick-up cam 139 and the arm 123 in the positions they occupy at the end of the contact opening movement. The cam 139 is adjustably secured to the rod 101 to provide a convenient means for varying the time at which it will engage the arm 123 and thus determine the time the resisting force is applied to the mechanism.

Fig. 10 illustrates graphically the applied resisting force of the shock absorber and the contact travel for both embodiments of the invention. Curve A representing the applied resisting force by means of the cam 139 (Figs. 6 and 7) and curve B the resisting force applied by means of the dual pick-up arms 131 and 133 (Figs. 3, 4 and 5).

An adjusting screw 141 (Figs. 3 to 7 inclusive) is provided to adjust the resisting force of the shock absorber. This adjustment is effected in a well known manner. By rotating the screw the flow of liquid past the piston (not shown) may be regulated to increase or decrease the resisting force of the absorber.

Having described preferred embodiments of the invention in accordance with the patent statutes, it is to be understood that various changes and modifications may be made in the embodiments disclosed without departing from the broad spirit and scope of the invention. It is, therefore, desired that the language of the appended claims be given as reasonably broad interpretation as the prior art permits.

We claim as our invention:

1. In a circuit breaker, the combination of a switch member movable to open and to closed circuit positions, means for actuating said switch member, a dashpot of the liquid type for absorbing the kinetic energy of the moving parts of said circuit breaker during the latter part of an operating stroke of said circuit breaker, said dashpot having a rotatable crank arm disposed adjacent a part movable with the circuit breaker, and means on said part for successively engaging said dashpot crank arm during the latter portion of an operating stroke at points spaced different distances from the axis of rotation of said arm to cause the decelerating force applied by said dashpot to the circuit breaker to progressively increase as the circuit breaker approaches the end of said operating stroke.

2. In a circuit breaker, the combination of a switch member movable to open and closed circuit positions, means for actuating said switch member, a dashpot of the liquid type for absorbing the kinetic energy of the moving parts of said circuit breaker during the latter part of an operating stroke of said circuit breaker, said dashpot having a rotatable crank arm disposed adjacent a part movable with the circuit breaker, and a cam on said part movable with the breaker for engaging said dashpot crank arm during the latter portion of an operating stroke, the configuration of said cam being such that it progressively decreases the moment arm with which the dashpot resists movement of said breaker to thereby cause the decelerating force applied by said dashpot to the circuit breaker to progressively increase as the circuit breaker approaches the end of said operating stroke.

3. In a circuit breaker, the combination of a switch member movable to open and closed circuit positions, means for actuating said switch member, a dashpot of the liquid type for absorbing the kinetic energy of the moving parts of said circuit breaker during the latter portion of an operating stroke of said circuit breaker, said dashpot having a rotatable crank arm disposed adjacent a part movable with the circuit breaker, and spaced projections on said part for successively engaging said dashpot crank arm during the latter portion of an operating stroke at points spaced at different distances from the axis of rotation of said crank arm to cause the decelerating force applied by said dashpot to the circuit breaker to progressively increase as the circuit breaker approaches the end of said operating stroke.

ROBERT C. DICKINSON.
WINTHROP M. LEEDS.